(12) United States Patent
Tobita

(10) Patent No.: US 10,379,426 B2
(45) Date of Patent: Aug. 13, 2019

(54) DOME-SHAPED COVER, METHOD FOR MANUFACTURING DOME-SHAPED COVER, MOLD FOR FORMING DOME-SHAPED COVER, AND CAMERA

(71) Applicant: CANON KABUSHIKI KAISHA, Tokyo (JP)

(72) Inventor: Shusuke Tobita, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/978,114

(22) Filed: Dec. 22, 2015

(65) Prior Publication Data

US 2016/0187764 A1 Jun. 30, 2016

(30) Foreign Application Priority Data

Dec. 25, 2014 (WO) ................. PCT/JP2014/084223

(51) Int. Cl.
| | |
|---|---|
| *B29D 11/00* | (2006.01) |
| *B29K 69/00* | (2006.01) |
| *G02B 27/00* | (2006.01) |
| *G03B 17/02* | (2006.01) |
| *G03B 17/56* | (2006.01) |

(52) U.S. Cl.
CPC ...... *G03B 17/568* (2013.01); *B29D 11/00413* (2013.01); *B29D 11/00519* (2013.01); *G02B 27/0006* (2013.01); *G03B 17/02* (2013.01); *B29K 2069/00* (2013.01); *B29K 2995/0018* (2013.01)

(58) Field of Classification Search
CPC ............... G02B 23/16; G02B 23/2476; G02B 27/0006; G02B 1/04; G03B 11/041; G03B 17/02; G03B 11/043; G03B 17/568; B29K 2069/00; B29K 2995/0018; B29D 11/00413; B29D 11/00519
USPC ................. 359/511, 507, 508, 512, 513, 514
See application file for complete search history.

(56) References Cited

U.S. PATENT DOCUMENTS

| | | | |
|---|---|---|---|
| 4,855,838 A | 8/1989 | Jones | |
| 7,661,890 B2 | 2/2010 | Basho | |
| 8,817,175 B2 * | 8/2014 | Wada | ................. G08B 13/1963 348/143 |
| 2006/0024046 A1 * | 2/2006 | Jones | ............... G08B 13/19619 396/427 |
| 2009/0310956 A1 * | 12/2009 | Takada | ................ B29C 45/2708 396/427 |
| 2014/0320968 A1 * | 10/2014 | Murata | .................. G02B 1/118 359/601 |

FOREIGN PATENT DOCUMENTS

| | | |
|---|---|---|
| CN | 1428230 A | 7/2003 |
| CN | 101351319 A | 1/2009 |
| GB | 2416637 B | 4/2007 |

(Continued)

*Primary Examiner* — Jade R Chwasz
(74) *Attorney, Agent, or Firm* — Canon U.S.A., Inc. IP Division

(57) ABSTRACT

A dome-shaped cover having a high optical performance in which formation of a weld mark is suppressed. The dome cover includes a hemispherical portion, a collar portion, and a cylindrical portion provided between the hemispherical portion and the collar portion, and the cylindrical portion has a thin portion recessed from an outer surface of the cylindrical portion.

24 Claims, 12 Drawing Sheets

(56) References Cited

FOREIGN PATENT DOCUMENTS

| | | |
|---|---|---|
| JP | 2000-156810 A | 6/2000 |
| JP | 2007-110484 A | 4/2007 |
| WO | 2007/043396 A1 | 4/2007 |
| WO | 2008/001624 A1 | 1/2008 |

* cited by examiner

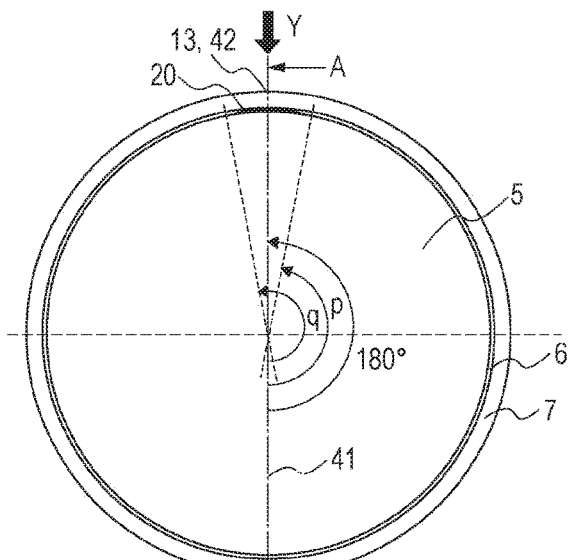
FIG. 1A
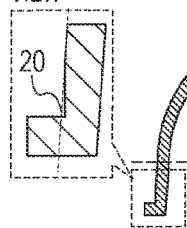
FIG. 1B
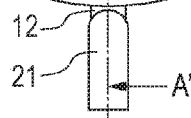
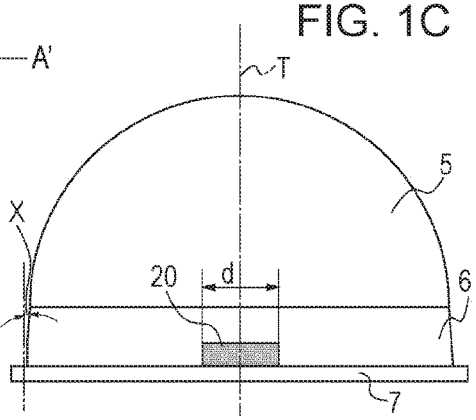
FIG. 1C
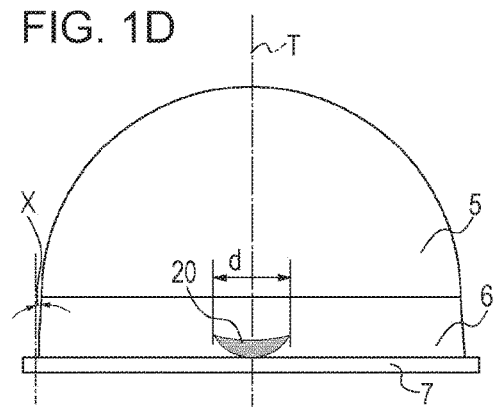
FIG. 1D
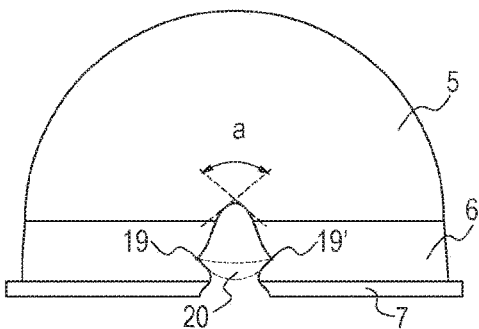
FIG. 1E

ENLARGED VIEW

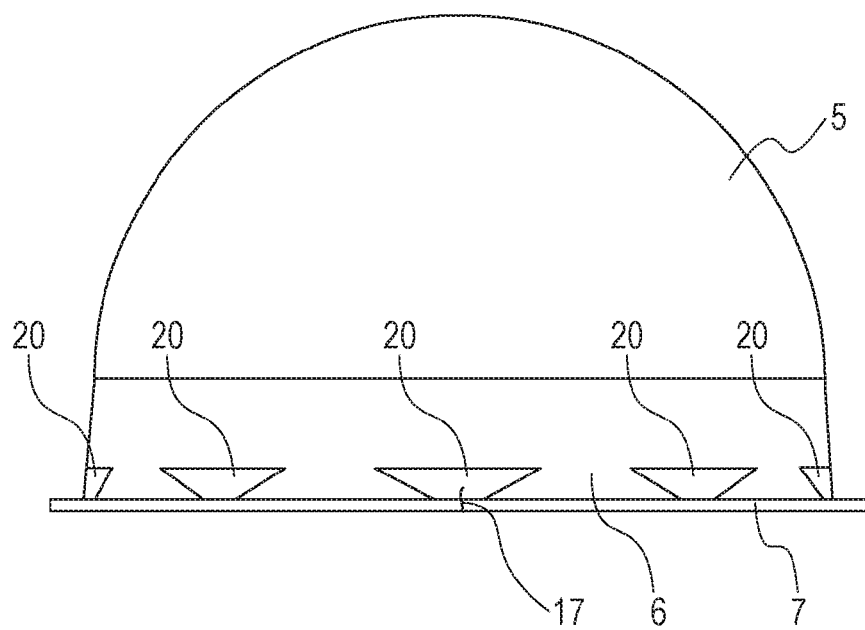
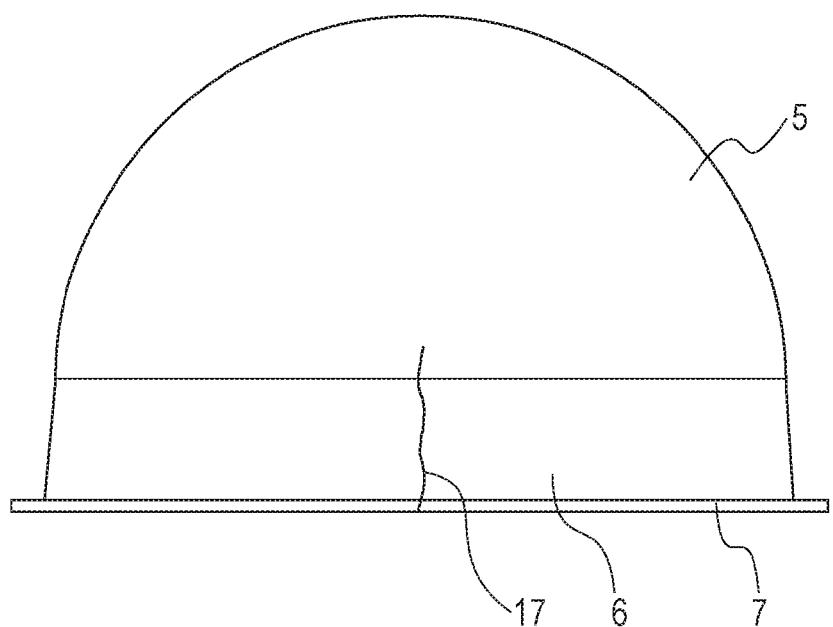

_US 10,379,426 B2_

DOME-SHAPED COVER, METHOD FOR MANUFACTURING DOME-SHAPED COVER, MOLD FOR FORMING DOME-SHAPED COVER, AND CAMERA

TECHNICAL FIELD

The present invention relates to a dome-shaped cover for a surveillance camera or the like manufactured by plastic injection molding. The present invention also relates to a method for manufacturing the dome-shaped cover, a mold for forming the dome-shaped cover, and a camera.

BACKGROUND ART

Network cameras for surveillance have come into widespread use. Various types of cameras are installed in various places, such as streets, public facilities, and houses. Some cameras are covered with dome-shaped covers. FIG. 10A is a schematic diagram illustrating a camera having a dome-shaped cover. The dome-shaped cover is illustrated in a cutaway view to show the camera disposed therein. A lens barrel 109 is capable of changing its orientation three-dimensionally in a dome-shaped cover 104, so that surveillance can be carried out in any selected shooting direction. A rotating direction 102 is referred to as 'pan', and a vertical tilting direction 101 is referred to as 'tilt'. In general, the orientation of the camera is expressed in terms of pan and tile angles. The tilt angle is 0° when the camera is oriented horizontally. The tilt angle is 90° when the camera is oriented toward the zenith.

The dome-shaped cover has a function of protecting the camera from deterioration due to weather and malicious damage or defacement. The dome-shaped cover is an exterior component, and is also a portion of an optical system of the camera at the same time. FIG. 10B illustrates the overall structure of the dome-shaped cover. An optically effective region 105 having a hemispherical shape is required to have a shape accuracy as high as that of lenses. The hemispherical surface has an open end connected to a substantially cylindrical portion 106, and the substantially cylindrical portion has a flange-shaped collar portion 107. The substantially cylindrical portion 106 is shaped such that the inner volume of the space that accommodates the camera can be increased. The collar portion 7 is shaped such that the dome-shaped cover can be bonded to a cover barrel 108.

Dome-shaped covers are generally manufactured by plastic injection molding to achieve mass production. For example, a cup-shaped container or the like is generally formed by arranging a pin gate of a hot runner at the shape center and performing molding such that the flow length to the opening edge of the container, which is at the flow end, is uniform over the entire circumference to suppress molding irregularities.

However, the hemispherical optically effective region of the dome-shaped cover is required to have high shape accuracy, and the gate cannot be arranged in this region. When the gate is arranged in the optically effective region, a gate mark remains on an optical surface, and the imaging performance of the camera will be degraded. Therefore, the dome-shaped cover cannot be manufactured by a method similar to the method for manufacturing the cup-shaped container. As illustrated in FIG. 11, a side gate 112 is generally arranged at an end of the collar portion 107 instead of a shape center 114.

When the side-gate method is used, there are two major paths along which the resin flows to a collar end portion 113, which serves as a flow end portion, at an end opposite the gate-side end. One path is a path 116 that extends directly upward from the gate along the substantially cylindrical portion 106, passes through the zenith (shape center) 114 of the hemispherical portion 105, and reaches the collar end portion 113 at the end opposite the gate-side end. The other path is a path 115 that extends from the gate to the collar end portion 113 at the end opposite the gate-side end in the circumferential direction of the substantially cylindrical portion 106. When the lengths of these two paths are compared, the former path is longer by twice the height k of the substantially cylindrical portion. In other words, the flow through the zenith is slower than the flow in the circumferential direction. FIG. 12A is a front view of the dome viewed from the end opposite the gate-side end immediately before the injection of the resin is completed. FIG. 12B is a front view of the dome viewed from the end opposite the gate-side end immediately after the injection of the resin is completed. Since the flow in the circumferential direction is faster, flow fronts of the resin join along a linear line at the end opposite the gate-side end on the cylindrical portion (angle a is small). As the angle a decreases, the length of the linear region in which the flow fronts of the resin join increases, and a weld mark 117 more easily remains as a joint line. The weld mark 117 serves as molding irregularities that cause a reduction in the optical performance. As the magnification of the camera increases, the diameter of the dome increases, and the height k of the substantially cylindrical portion increases accordingly. As a result, the weld mark is more easily formed.

In PTL 1, the resin flow through the zenith is accelerated by increasing the thickness of the zenith portion. In addition, the resin flow in the circumferential direction is decelerated by forming a thin portion along the opening edge of the dome-shaped cover.

CITATION LIST

Patent Literature

PTL 1 Japanese Patent Laid-Open No. 2000-156810

However, when the cover thickness in the zenith direction is increased as in PTL 1, the following problem occurs. That is, the image quality will be degraded due to the influence of the difference in the cover thickness. In addition, since a thin portion is formed along the opening edge of the dome-shaped cover, to form such a shape, a side surface of a convex mold needs to be processed into a shape to be transferred to form the thin portion. Such a process is difficult, and it is also difficult to finely adjust the shape.

SUMMARY OF INVENTION

According to an aspect of the present invention, there is provided a dome-shaped cover that includes a hemispherical portion, a collar portion, and a cylindrical portion provided between the hemispherical portion and the collar portion, and the cylindrical portion has a thin portion recessed from an outer surface of the cylindrical portion.

A camera according to the present invention includes the above-described dome-shaped cover.

In a method for manufacturing a dome-shaped cover according to the present invention, the dome-shaped cover is manufactured by forming a cavity and injecting resin into the cavity through a gate, the cavity being formed by a stripper plate, a concave mold piece for forming an outer surface of a hemispherical portion, and a convex mold piece for forming inner surfaces of the hemispherical portion and a cylindrical portion for increasing a volume. The stripper plate includes the gate through which the resin is injected, a recessed portion for forming a collar portion, a projecting portion for forming a thin portion, and a forming portion for forming an outer surface of the cylindrical portion.

A mold for manufacturing a dome-shaped cover according to the present invention includes a stripper plate including a gate through which resin is injected, a recessed portion for forming a collar portion, and a projecting portion for forming a thin portion, and a cavity is formed by a concave mold piece for forming an outer surface, the stripper plate, and a convex mold piece for forming an inner surface.

Further features of the present invention will become apparent from the following description of exemplary embodiments with reference to the attached drawings.

BRIEF DESCRIPTION OF DRAWINGS

FIGS. 1A to 1E illustrate a dome-shaped cover according to a first embodiment.

FIGS. 6A and 6B illustrate a weld mark.

DESCRIPTION OF EMBODIMENTS

A dome-shaped cover according to a first embodiment of the present invention will be described with reference to FIG. 1.

FIG. 1A is a top view of the dome-shaped cover in the state in which the open end of a hemispherical portion faces downward. FIG. 1B is a sectional view of FIG. 1A taken along line IB-IB. FIG. 1C is a front view of FIG. 1A viewed in the Y direction. FIG. 1D illustrates a modification of a thin portion. FIG. 1E is a front view of FIG. 1D viewed in the Y direction immediately before the injection is completed.

Figure 10A:
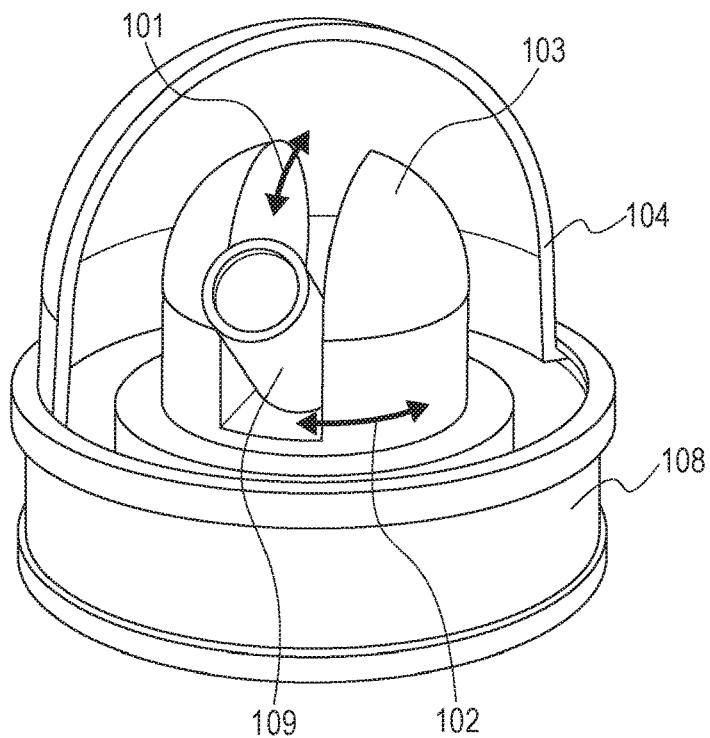
FIG. 10A illustrates a camera having a dome-shaped cover (only the cover is illustrated in a cutaway view).
Figure 10B:
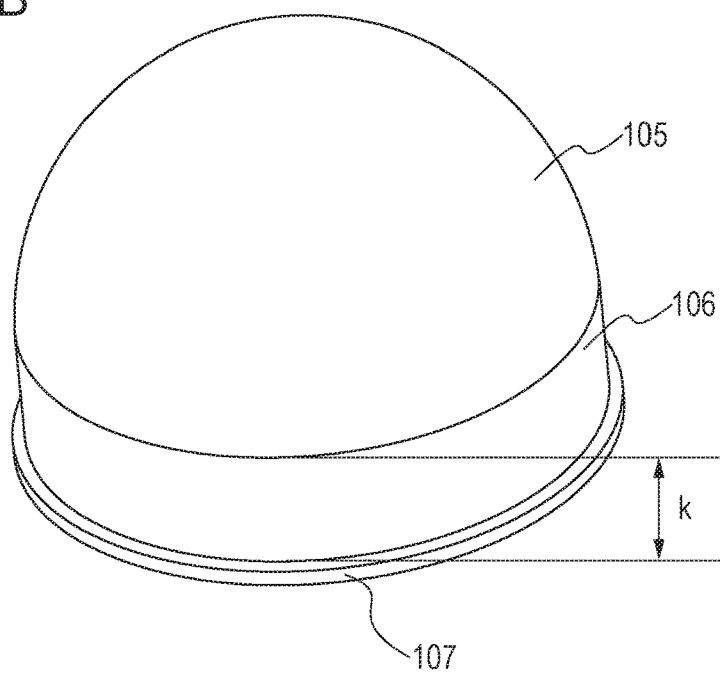
FIG. 10B illustrates the dome-shaped cover.
Figure 11:
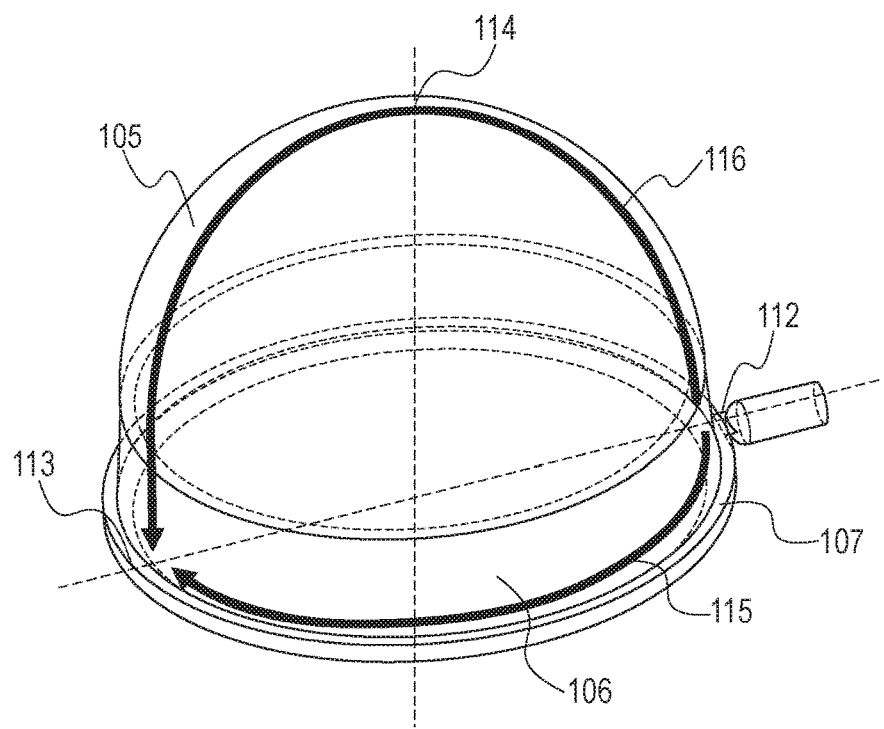
FIG. 11 is a dome-shaped cover formed by using a side gate.
Figure 12A:
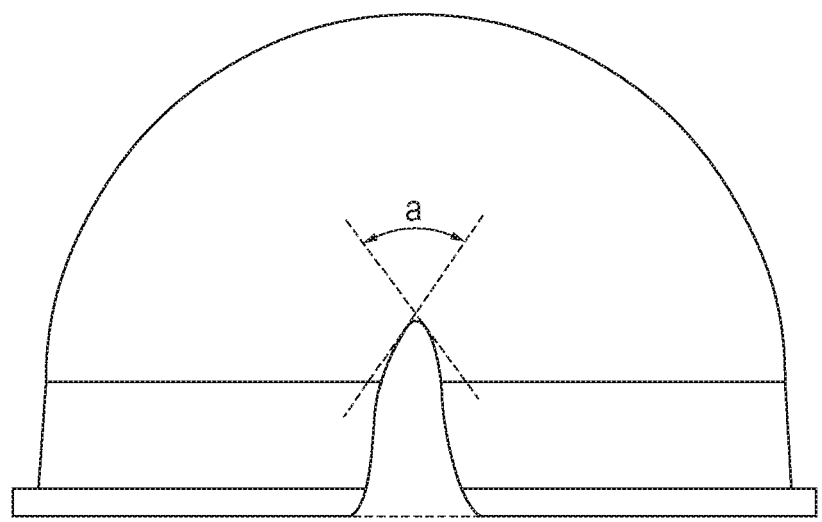
FIG. 12A illustrates a resin joining angle at an end opposite a gate-side end.
Figure 12B:
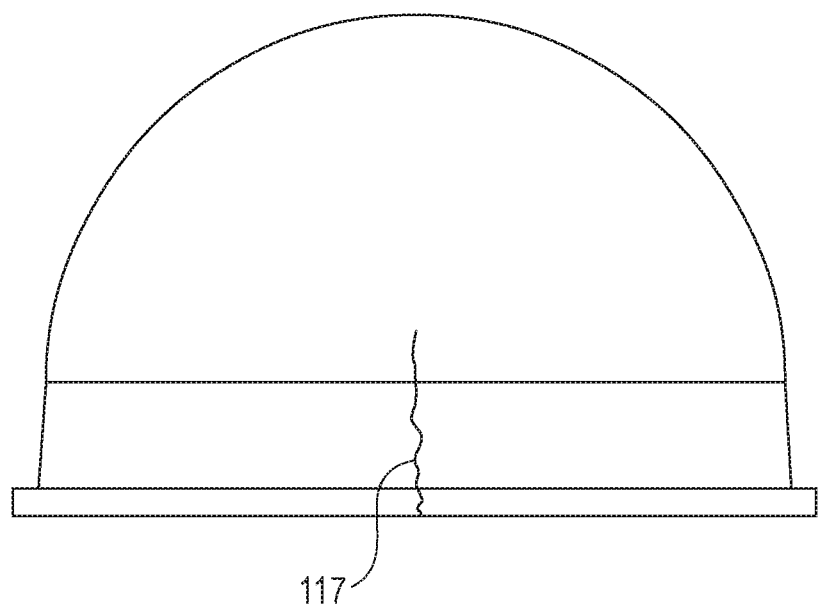
FIG. 12B illustrates a weld mark formed at the end opposite the gate-side end.

Reference numeral 12 denotes a gate through which resin is injected into a space (cavity) having the shape of the dome-shaped cover when the dome-shaped cover is manufactured by plastic injection molding, and 21 denotes a runner. The gate 12 and the runner 21 are removed during the manufacture of the dome-shaped cover. In this specification, a portion of the dome-shaped cover from which the gate 12 is removed is referred to as a gate mark. Reference numeral 5 denotes the hemispherical portion. A surface at the outer side (upper side) of the hemispherical portion is referred to as an outer surface, and a surface at the inner side (lower side) of the hemispherical portion is referred to as an inner surface. The outer and inner surfaces of the hemispherical portion 5 both have very small surface roughnesses (mirror surfaces), and have a shape accuracy as high as that of lenses. The open end of the hemispherical portion 5 is connected to a cylindrical portion 6. The cylindrical portion 6 has a flange-shaped collar portion 7 at an end opposite the end adjacent to the hemispherical portion 5. In this specification, a portion between the hemispherical portion 5 and the collar portion is referred to as the cylindrical portion (connecting portion). A surface of the cylindrical portion 6 (connecting portion) that is connected to the outer surface of the hemispherical portion is also referred to as an outer surface, and a surface of the cylindrical portion 6 (connecting portion) that is connected to the inner surface of the hemispherical portion is also referred to as an inner surface. The collar portion 7 is shaped such that the dome-shaped cover can be joined to a cover barrel (denoted by 108 in FIG. 10A).

Reference numeral 42 denotes a last filled portion which is filled with the resin last when the resin is injected through the gate 12. In the present embodiment, the last filled portion 42 is an opposite-to-gate portion 13 disposed at the end opposite the end at which the gate 12 is provided. The dome-shaped cover according to the present embodiment has a shape symmetrical about a centerline 41 that extends through the gate 12 and the opposite-to-gate portion 13. When it is defined that the gate is located at the origin 0° around the center of the hemispherical portion and the counterclockwise direction is the positive direction, the angular position of the last filled portion 42 is 180°. A thin portion 20 is arranged such that, for example, p=167°, q=193°, and p<180°<q. The thin portion 20 is shown as a black filled area for the purpose of emphasis.

At least the outer surface of the cylindrical portion 6 is at an angle so that the opening diameter increases toward the collar portion 7. The outer surface is at an angle of X° with respect to an optical axis T so that the diameter increases toward the collar portion 7. The angle X is 5° or more and 10° or less. When the angle is too large, the imaging resolution in the wide-angle area (tilt angle of, for example, 0° decreases. When the angle is too small, there is a risk that the draft angle will be too small and the molded part cannot be removed from the mold.

Reference numeral 20 denotes a thin portion recessed from the outer surface of the cylindrical portion (connecting portion) 6. A portion of the cylindrical portion (connecting portion) 6 excluding the thin portion is at an angle of X° with respect to the optical axis T, and the thin portion 20 is at an angle smaller than X° with respect to the optical axis. The angle may be 0° (the thin portion 20 may be parallel to the optical axis). Thus, the thickness is reduced. In other words, the thickness of the thin portion is large at the hemispherical-portion side and small at the collar-portion side. In this case, there is no undercut in the injection molding process, so that the recessed portion can also be released from the mold.

Figure 3:
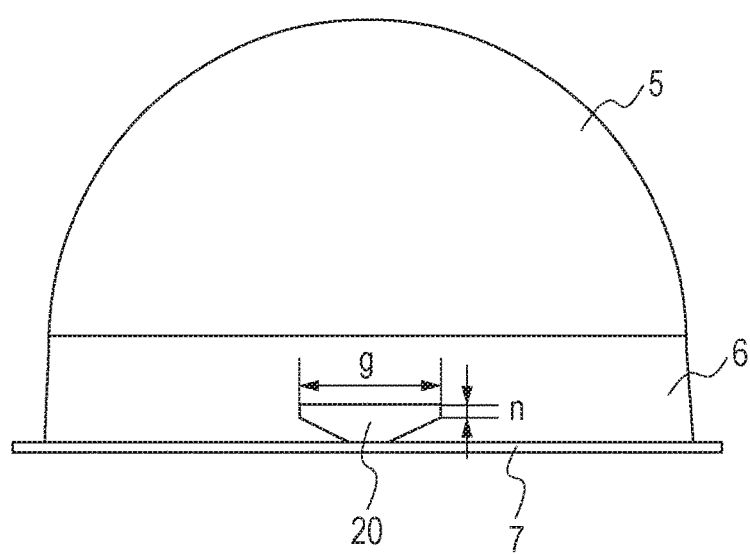
FIG. 3 illustrates a modification of the first embodiment.

The thin portion 20 of the present embodiment may have a rectangular shape as illustrated in FIG. 1C, or a shape illustrated in FIG. 1D in which the width of the thin portion 20 is large at the hemispherical-portion side and small at the collar-portion side. The shape is not limited to this, and may instead be a pentagonal shape as illustrated in FIG. 3. In the shape illustrated in FIG. 3, an upper section of the thin portion 20 includes a region n in which the width g is constant from the hemispherical-portion-5 side toward the collar portion 7. In a region below the region n, the width g decreases from the hemispherical-portion-5 side toward the collar portion 7. The thin portion may have a curved contour as long as there is no undercut.

Each of the above-described shapes of the thin portion 20 is such that, as illustrated in FIG. 1E, top ends 19 and 19' of the thin portion 20 are separate from each other. The thin portion 20 is shown by broken lines because it is not filled yet. The thin portion 20 is disposed in the last filled portion 42 (in the opposite-to-gate portion 13 in the present embodiment), so that the flow of the resin from the gate in the circumferential direction of the cylindrical portion 6 (connecting portion) is suppressed. Accordingly, the flow of the resin from the gate toward the end opposite the gate-side end through the zenith (shape center) of the hemispherical portion 5 catches up with the suppressed resin flow and joins the suppressed resin flow at a more appropriate time. Thus, the flow fronts of the resin that has flowed in the circumferential direction of the cylindrical portion 6 are prevented from encountering each other. This is also clear from the fact that the joining angle a of the resin in FIG. 1E is greater than that in the related art. Thus, the formation of a weld mark can be suppressed. As the resin joining angle a increases and becomes more obtuse, the encountering of the flow fronts of the resin flow in the circumferential direction can be further suppressed, and it becomes more difficult for the joint line (weld mark) to remain. By suppressing the formation of a weld mark, the molding irregularities can be reduced and a reduction in the optical performance can be prevented. The resin joining angle a can be effectively set to an obtuse angle largely owing to the configuration in which the top ends 19 and 19' of the thin portion 20 are separate from each other in the circumferential direction of the cylindrical portion (connecting portion) 6, that is, in which the width of the thin portion 20 is large at the mirror-surface-portion side. The effect of suppressing the formation of a weld mark can be enhanced by increasing the width of the thin portion 20 at the mirror-surface-portion side; however, q-p is preferably 3° or more and 40° or less. When the width is too large, the size of the thin portion increases and the product strength decreases accordingly. When the width is too small, the weld-mark suppressing effect decreases.

Thus, the formation of a weld mark can be suppressed and a dome-shaped cover having a high optical performance can be obtained. Accordingly, a camera having this dome-shaped cover is capable of capturing a high-quality image.

When the thin portion 20 is shaped such that the width thereof is large at the hemispherical-portion side and small at the collar-portion side as illustrated in FIG. 1D, a volume reduction caused by the thin portion can be reduced. Therefore, a reduction in the strength of the product can be suppressed. In addition, when the thin portion 20 is provided on the outer side of the connecting portion 6, the adjustment of the thin portion can be facilitated.

Figure 2A:
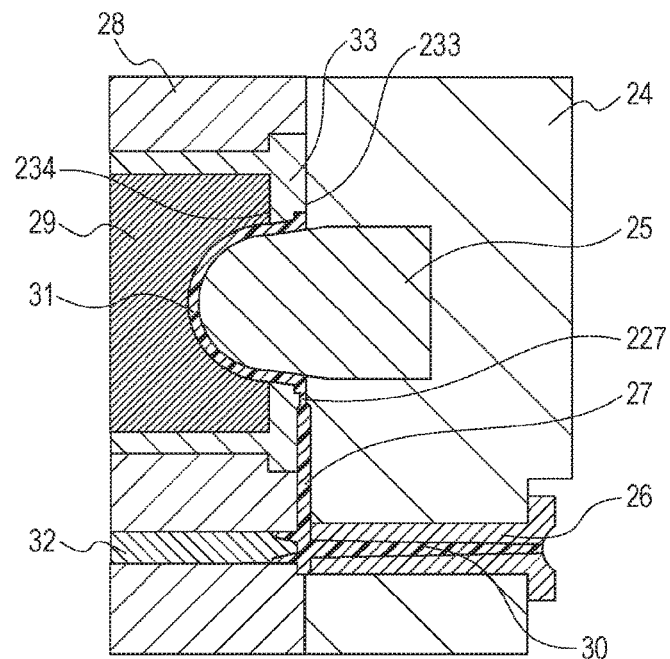
FIGS. 2A and 2B illustrate a mold for the dome-shaped cover according to the first embodiment.
Figure 2B:
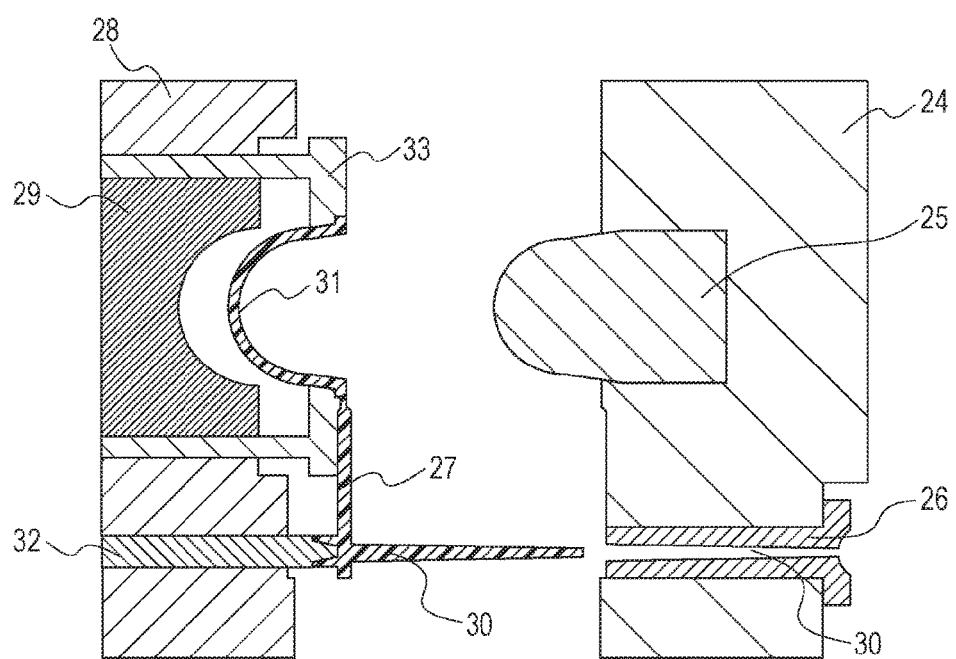

A method for manufacturing the dome-shaped cover according to the present embodiment will now be described. A dome-shaped-cover mold for forming the dome-shaped cover by injection molding is illustrated in FIGS. 2A and 2B. FIG. 2A illustrates the state in which the mold is closed and the resin injection process is completed. FIG. 2B illustrates the state in which the mold is opened and an ejection process is completed.

Reference numeral 24 denotes a fixed die set, 25 denotes a convex mold piece for forming the inner surfaces of the hemispherical portion and the connecting portion, 26 denotes a sprue bush, 28 denotes a movable die set, 29 denotes a concave mold piece for forming the outer surface of the hemispherical portion, 33 denotes a stripper plate, 32 denotes a center pin, 30 denotes a sprue, 227 denotes a gate, 27 denotes a runner, and 31 denotes the dome-shaped cover as a molded part.

A recessed portion 233 for forming the collar portion and a forming portion 234 for forming the outer surface of the connecting portion for increasing the volume are formed on the inner peripheral surface of the stripper plate 33. A projecting portion (not shown) for transferring (forming) the thin portion 20 is formed at the end opposite the gate-side end.

The gate 227 and the runner 27 through which the resin is injected are also formed in the stripper plate 33.

A molten resin is injected into the space (cavity) surrounded by the stripper plate 33, the concave mold piece, and the convex mold piece through the sprue 30, the runner 27, and the gate 227.

The resin material may be, for example, polycarbonate.

As illustrated in FIG. 2B, when cooling of the resin is completed and the mold is opened, the molded part is separated from the convex mold piece. Then, the stripper plate 33 and the center pin 32 project outward so that the molded part is separated from the concave mold piece. Then, an ejector pin (not shown) pushes out the molded part so that the molded part is released from the stripper plate 33. Thus, the releasing process is completed.

The projecting portion (not shown) is preferably shaped such that the width thereof decreases toward the collar portion. In addition, the forming portion 234 for forming the outer surface of the connecting portion, the forming portion 234 being provided on the inner peripheral surface of the stripper plate 33, is shaped so as to be at an angle with respect to the mold opening direction such that the opening diameter thereof increases toward the collar portion. The projecting portion (not shown) is shaped so as to be at an angle smaller than the angle of the forming portion 234, or so as to be parallel to the mold opening direction. Thus, the amount of projection increases toward the collar portion. With this structure, there is no undercut and the molded part can be released by the ejector pin.

In addition, with this structure, the shape and arrangement of the thin portion can be freely changed by replacing the stripper plate.

In addition, since the area in which the dome-shaped cover is in contact with the mold is large, by using the stripper plate, the molded part can be more reliably released than in the case where an ejector pin is used.

A dome-shaped cover according to a second embodiment of the present invention will be described with reference to FIG. 4.

Portions having the same function as those in the first embodiment are denoted by the same reference numerals, and descriptions thereof are thus omitted.

Figure 4A:
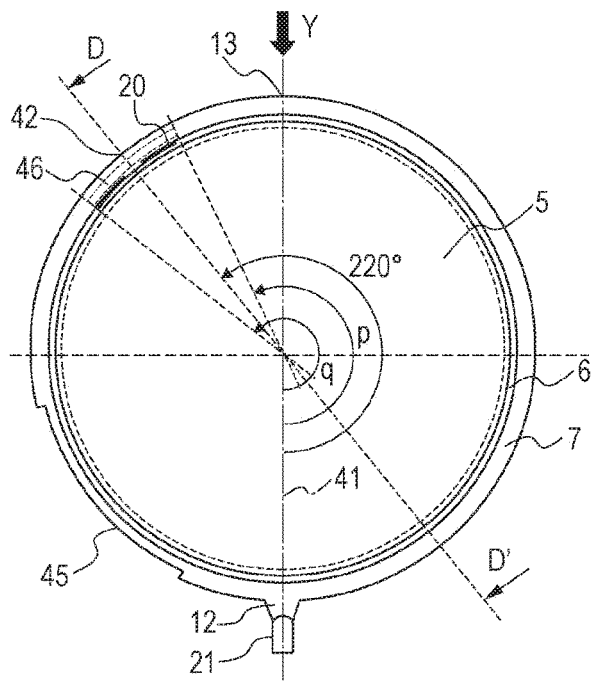
FIGS. 4A to 4C illustrate a dome-shaped cover according to a second embodiment.
Figure 4B:
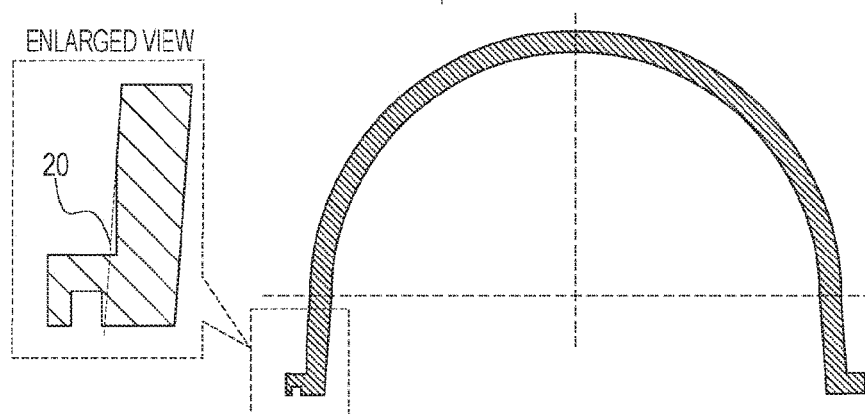
Figure 4C:
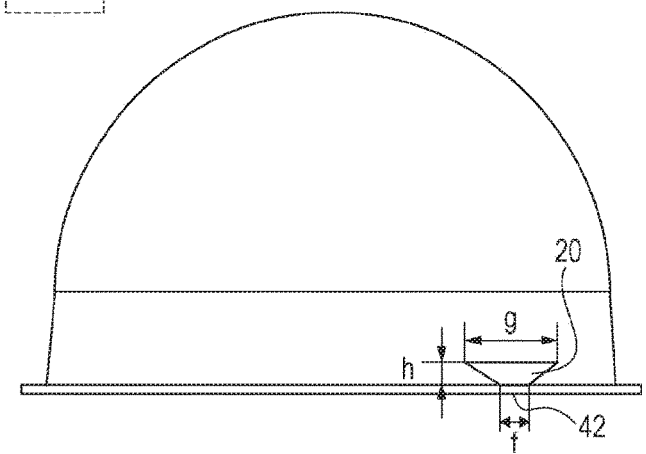

FIG. 4A is a top view of the dome-shaped cover in the state in which the open end of a hemispherical portion faces downward. FIG. 4B is a sectional view of FIG. 4A taken along line IVB-IVB. FIG. 4C is a front view of FIG. 4A viewed in the Y direction.

The dome-shaped cover according to the present embodiment has a cut 45 in a collar portion 7 at a position asymmetrical about a centerline 41 that extends through a gate-side end and an end opposite the gate-side end. The cut 45 serves as a flow resistance so that, in FIG. 4A, the flow of the resin from a gate 12 in the counterclockwise circumferential direction of a connecting portion 6 is faster than the flow of the resin in the clockwise circumferential direction. Therefore, a last filled portion is displaced from an opposite-to-gate portion 13. FIG. 4D shows that a last filled portion 42 is shifted from the opposite-to-gate portion 13. As illustrated in FIG. 4A, when it is defined that the gate is located at the origin 0° around the center of the hemispherical portion and the counterclockwise direction is the positive direction, the angular position of the last filled portion 42 is 220°. A thin portion 20 having an inverted trapezoidal shape may be formed in the connecting portion 6 such that, for example, p=207°, q=233°, and p<220°<q.

The technology of the present embodiment is to suppress the formation of a weld mark by forming a thin portion, which serves as an obstacle to the flow, in the last filled portion 42 to make the resin joining angle obtuse. Accordingly, this effect is obtained by arranging the thin portion 20 such that the center thereof is around the last filled portion. As illustrated in FIG. 4A, in the present embodiment, in addition to the thin portion 20 formed in the connecting portion 6, a thin portion 46 is also formed in the collar portion 7. With this structure, the joining angle of the resin becomes more obtuse, and the weld-mark suppressing effect is increased.

Dome-shaped covers generally have a shape that is line symmetrical about the line that connects a gate-side end and an end opposite the gate-side end. Therefore, the last filled portion is generally at the end opposite the gate-side end. However, as in the present embodiment, a dome-shaped cover may have a asymmetrical shape depending on how it is assembled to a camera barrel or the design of other components. In such a case, the thin portion is arranged in accordance with the location of the last filled portion.

Even when the dome-shaped cover has a symmetrical shape, there is a possibility that the last filled portion will be shifted from the opposite-to-gate collar portion 13 depending on the temperature distribution of the mold or how uniformly the gas is discharged from the cavity. Also in this case, as in the second embodiment, a similar effect can be obtained by arranging the thin portion 20 at a location corresponding to the last filled portion.

Example

An example of the present invention will now be described.

Figure 5A:
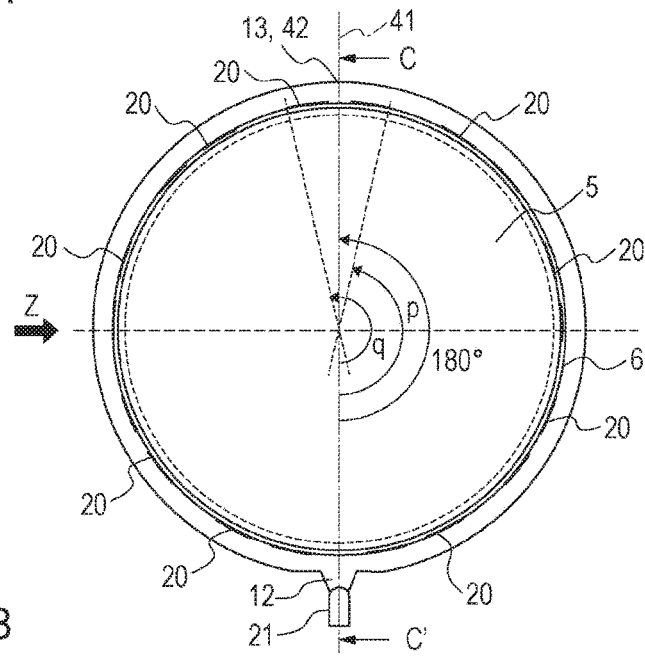
FIGS. 5A to 5C illustrate an example.
Figure 5B:
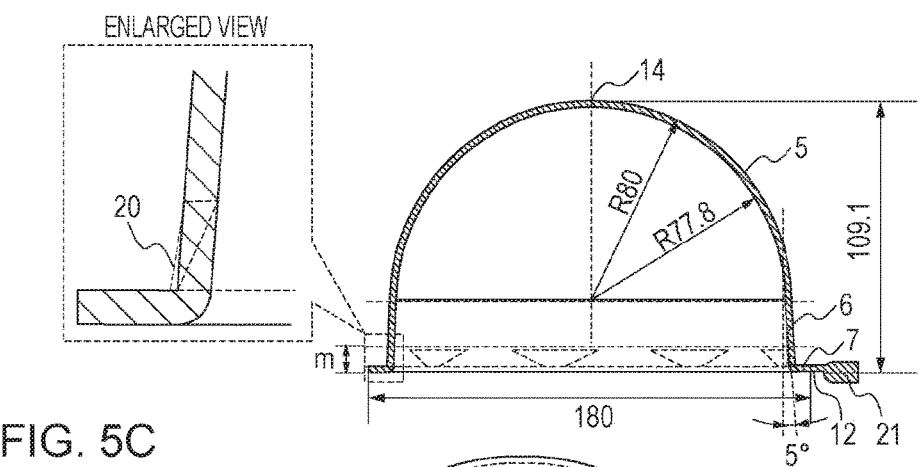
Figure 5C:
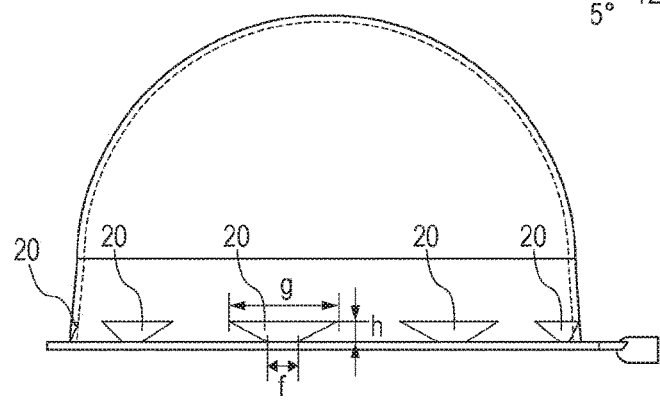

FIG. 5A is a top view of a dome-shaped cover formed as the example in the state in which the open end of a hemispherical portion faces downward. FIG. 5B is a sectional view of FIG. 5A taken along line VB-VB. FIG. 5C is a front view of FIG. 5A viewed in the Z direction.

As illustrated in FIG. 5B, the outer shape of the collar of the dome was such that the diameter thereof was 180 mm. The outer radius of the hemispherical portion 5 was 80 mm, and the inner radius of the hemispherical portion 5 was 77.8 mm. The thickness was constant over the entire area except for local areas such as chamfered portions. The thickness was 2.2 mm. The distance from the bottom of a collar portion 7 to the zenith 14 was 109.1 mm. A connecting portion 6 was at an angle of 5°. The shape was line symmetrical about a centerline 41 that connects a gate-side end and an end opposite the gate-side end.

A certain region m between the bottom of the collar portion 7 and a portion of the connecting portion 6 becomes externally invisible when the dome-shaped cover is assembled to a cover barrel. In the present example, m was 10 mm.

Thin portions 20 may be provided at any locations on the connecting portion 6 as long as the thin portions 20 are outside the field of view of the camera. However, in consideration of product design, the thin portions 20 are preferably arranged in an externally invisible area. Referring to FIG. 5C, in the present example, the thin portions 20 had a top width g of 36.5 mm, a bottom width f of 8.6 mm, and a height h of 6.6 mm, and were arranged such that the thin portions 20 were not visible in the assembled state.

In the dome of the present example, a last filled portion 42 was at an opposite-to-gate portion 13. When it is defined that a gate is located at the origin 0° around the center of the hemispherical portion and the counterclockwise direction is the positive direction, the angular position of the last filled portion 42 was 180°. A thin portion 20 having an inverted trapezoidal shape was arranged such that p=167°, q=193°, and p<180°<q.

Eight other thin portions 20 were arranged line symmetrically about the centerline 41 that connects the gate-side end and the end opposite the gate-side end. The thin portions 20 other than the thin portion 20 arranged at the opposite-to-gate portion 13 served as a resistance against the flow of the resin along the connecting portion 6, and had an effect of further suppressing the formation of a weld mark. The thin portions are preferably arranged symmetrically so that the molded part contracts uniformly after the injection molding process. When a thin portion is provided directly blow the gate, the flow in the direction toward the center of the hemispherical portion (toward the zenith) is obstructed, and the formation of a weld mark is promoted. Therefore, no thin portion was arranged directly below the gate.

As a first comparative example, molding was performed by using a stripper plate 33 that did not have any particular shape on the inner peripheral surface thereof. The first comparative example was compared with the present example in terms of the area of the weld mark formed on the molded part.

FIG. 6A is a sketch of a weld mark 17 of the present example. FIG. 6B is a sketch of the weld mark 17 in the case where no particular shape was formed. Both sketches are front views viewed from the end opposite the gate-side end.

In the present example, the weld mark 17 was formed only in the collar portion 7 and a portion of the thin portion 20, and there was no optical influence. In contrast, in the first comparative example in which no particular shape was formed, the weld mark 17 extended into the hemispherical portion 5, which is an optically effective region, and the quality was degraded.

Although all of the thin portions had the same shape in the present example, the thin portions do not need to have the same shape. However, when the thin portions are shaped or arranged such that they are not line symmetrical, the flow resistance varies and the last filled portion changes. Accordingly, the thin portion 20 arranged in accordance with the location of the last filled portion needs to be moved. Therefore, unless there is a special reason not to, the thin portions preferably have the same shape.

As a second comparative example, thin portions were formed in a trapezoidal shape. The second comparative example was compared with the present example in terms of the area of the weld mark formed on the molded part.

Figure 7A:
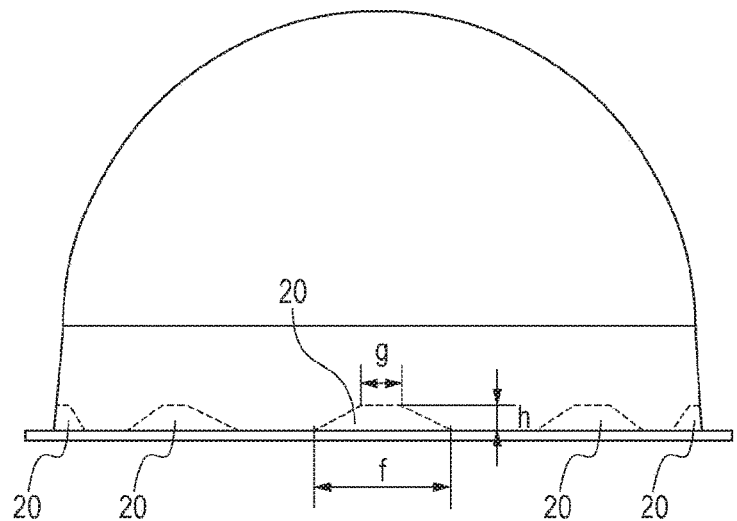
FIGS. 7A to 7C illustrate a second comparative example.

According to the second comparative example, the thin portions had a trapezoidal shape. FIG. 7A is a front view viewed from the end opposite the gate-side end. When the thin portions having a trapezoidal shape are formed on the outer side of the dome-shaped cover, the thin portions serve as undercuts and the molded part cannot be released from the mold. Therefore, as in PTL 2, the thin portions were formed on the inner side along the opening edge of the dome. Since the thin portions shown in FIG. 7A are formed in the inner surface of the dome cover and are not externally visible, the thin portions are shown by broken lines. The thin portions had a top width g of 8.6 mm, a bottom width f of 36.5 mm, and a height h of 6.6 mm. Similar to the present example, in addition to the thin portion at the opposite-to-gate portion 13, eight other thin portions were arranged line symmetrically about a centerline that connects the gate-side end and the end opposite the gate-side end.

The shape of the second comparative example is the same as that of the present example except that the thin portions were vertically inverted. The amount by which the volume is reduced because of the thin portions is substantially the same as that in the present example, and therefore the product strength is also substantially the same as that in the present example.

Figure 7B:
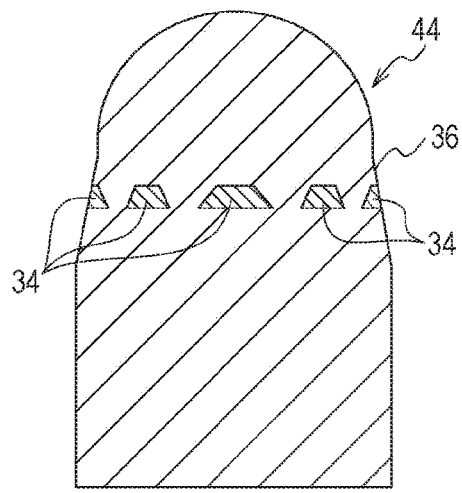
Figure 7C:
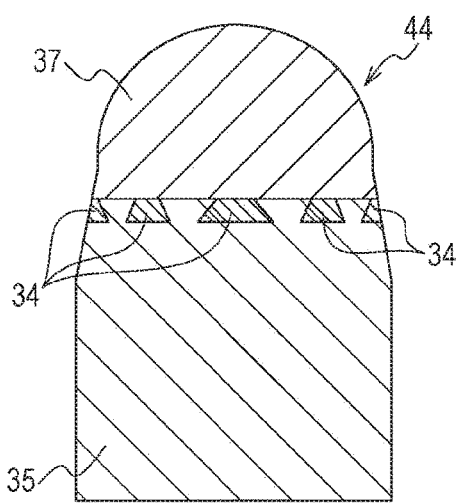

FIGS. 7B and 7C are convex mold pieces used to form the shape of the second comparative example by injection molding. To form the thin portions on the inner side of the dome-shaped cover, as illustrated in FIG. 7B, a side surface of a convex mold piece 44 needs to have shapes 34 for transferring the thin portions. However, it was found that it is very difficult to form a mold piece having such a shape. Since the resin flows three dimensionally from the side gate to form the dome cover, there may be a case in which the formation of a weld mark cannot be accurately predicted by flow analysis simulation. Thus, it was found that it is necessary to adjust the flow by changing the shape of the thin portions while observing the actual molding process.

In such a case, with the convex mold piece 44 according to the second comparative example, the entirety of the convex mold piece 44 including the high-precision mirror surface needs to be re-formed to adjust the shape and arrangement of the thin portions. Thus, the adjustments and corrections cannot be easily performed.

The above-described problem can be solved to some extent by dividing the convex mold piece 44 into a hemispherical portion 37 and a leg portion 35, as illustrated in FIG. 7B, and forming the thin-portion transferring shapes 34 on the leg portion 35. However, it is difficult to align the hemispherical portion 37 and the leg portion 35. It was found that, when the hemispherical portion 37 and the leg portion 35 are misaligned, there will be problems such as reduction in the optical performance, formation of undercuts, or a molding failure.

In contrast, according to the present example, the shape of the thin portions 20 can be changed simply by re-forming the stripper plate 33, which is an annular component. Therefore, the shape of the thin portions 20 can be changed easily at a low cost.

Figure 8:
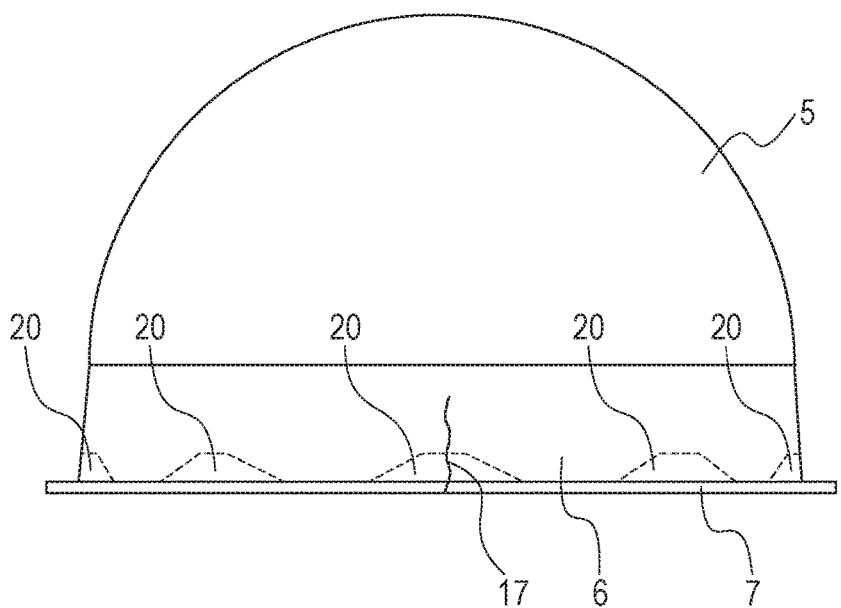
FIG. 8 illustrates a weld mark of the second comparative example.

FIG. 8 is a sketch of a weld mark 17 of the second comparative example.

In the second comparative example, the weld mark 17 extended into the substantially cylindrical portion 6 through the collar portion 7 and the thin portion 20.

In the second comparative example, the weld mark 17 was smaller than that in the first comparative example. This is probably because since a plurality of thin portions 20 were arranged along the opening edge, the thin portions 20 served as a resistance against the flow of the resin along the substantially cylindrical portion.

However, in the second comparative example, the weld mark 17 extended into the substantially cylindrical portion, and the area in which the weld mark 17 was present was larger than that in the present example. Although the area was outside the hemispherical portion 5, which is the optically effective surface, the area was included in the field of view when the camera was oriented in the pan direction. Therefore, the quality of the camera can be improved by eliminating such a weld mark.

Figure 9A:
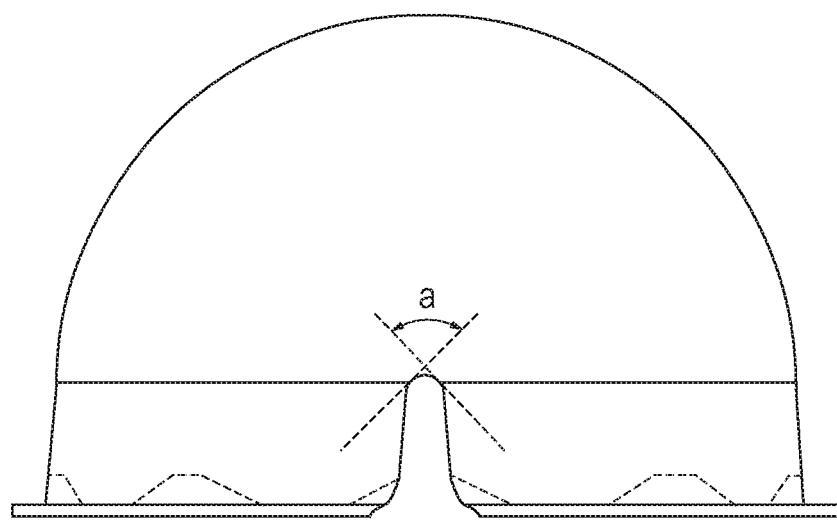
FIGS. 9A and 9B illustrate the example and the second comparative example.
Figure 9B:
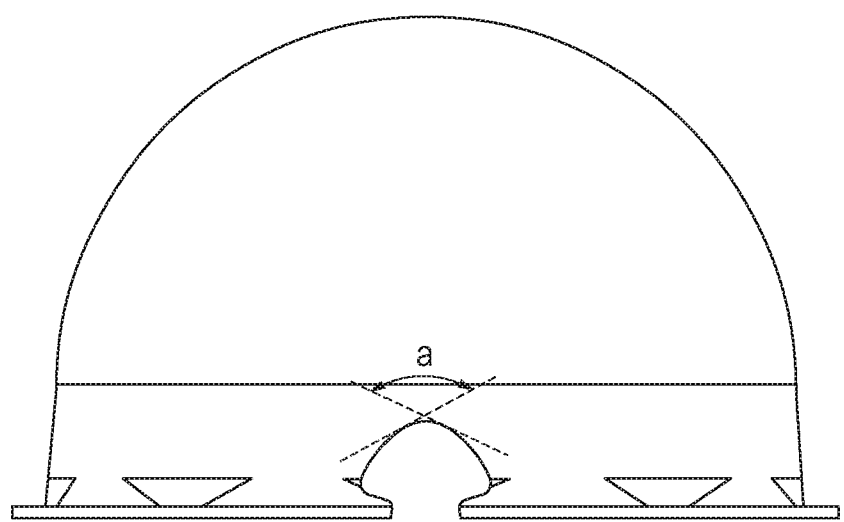

FIGS. 9A and 9B are front views viewed from the end opposite the gate-side end, illustrating the manner in which the flow fronts of the resin flow along the dome cover join immediately before the injection is completed. FIG. 9A shows the dome-shaped cover according to the second comparative example, and FIG. 9B shows the dome-shaped cover according to the present example.

In the second comparative example, the top width g of the thin portion at the end opposite the gate-side end was smaller than that in the present example. Therefore, as illustrated in FIG. 9A, the effect of increasing the resin joining angle at the last filled portion was small. Accordingly, the resin joining angle a was not obtuse enough and the weld mark 17 remained in a relatively large area.

In the present example, the reduction in volume due to the thin portions was substantially equal to that in the second comparative example, that is, the product strength was substantially equal to that in the second comparative example. However, it was confirmed that the weld-mark suppressing effect was higher than that in the second comparative example. To effectively enhance the weld-mark suppressing effect, the top width g of the thin portion 20 at the end opposite the gate-side end needs to be provided at as high a location as possible on the substantially cylindrical portion. The top width g is appropriately adjusted in accordance with the required product strength and the degree of the weld mark.

In the present example, the thin portions were provided at locations where the thin portions are invisible from the outside of the product. However, if there is no limitation regarding the product performance or design, the thin portions may instead be provided at locations near the boundary of the hemispherical portion.

The present invention provides a dome-shaped cover having a high optical performance in which formation of a weld mark can be suppressed by a simple method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2014/084223, filed Dec. 25, 2014, which is hereby incorporated by reference herein in its entirety.

The invention claimed is:

1. A dome-shaped cover comprising:
a hemispherical portion,
a collar portion, and
a cylindrical portion,
wherein the hemispherical portion has an outer surface and an inner surface,
wherein the cylindrical portion has an outer surface and an inner surface, and the outer surface forms an outer circumference of the cylindrical portion,
wherein the hemispherical portion has an end connected to an end of the cylindrical portion, and the cylindrical portion has an end connected to an end of the collar portion at an end opposite to the end connected to the hemispherical portion, wherein the collar portion has a gate mark,
wherein the cylindrical portion has a thin portion, the thin portion being recessed from the outer surface of the cylindrical portion toward the inner surface of the cylindrical portion,
wherein the outer surface of the thin portion is a part of the outer surface of the cylindrical portion,
wherein, in a circumferential direction of the cylindrical portion, the thin portion is between other portions of the cylindrical portion that are thicker than the thin portion, and
wherein a portion of the outer surface of the cylindrical portion that is closest to the gate mark is located, on the outer circumference of the cylindrical portion, opposite to the thin portion.

2. The dome-shaped cover according to claim 1, wherein a width of the thin portion closer to the hemispherical portion is larger than the width of the thin portion closer to the collar portion.

3. The dome-shaped cover according to claim 1, wherein a thickness of the thin portion closer to the hemispherical portion is larger than the thickness of the thin portion closer to the collar portion.

4. The dome-shaped cover according to claim 1, wherein a portion of the collar portion has a cut.

5. The dome-shaped cover according to claim 1, wherein a portion of the collar portion has a thin portion.

6. A camera comprising the dome-shaped cover according to claim 1.

7. A network camera comprising the dome-shaped cover according to claim 1.

8. The dome-shaped cover according to claim 1, wherein the thin portion is shaped so as to suppress formation of a weld mark and facilitate the hemispherical portion having a high optical performance.

9. The dome-shaped cover of claim 1, wherein the thin portion and a portion of the cylindrical portion that abuts the thin portion are formed from a continuous material.

10. The dome-shaped cover of claim 9, wherein the material is transparent.

11. The dome-shaped cover of claim 1, wherein the hemispherical portion and the cylindrical portion are transparent.

12. The dome-shaped cover of claim 1, wherein a maximum width of the thin portion is less than 20% of the outer circumference of the cylindrical portion.

13. The dome-shaped cover of claim 1, wherein the thin portion does not extend to an edge of the hemispherical-portion end of the cylindrical portion, where the cylindrical portion connects to the hemispherical portion.

14. The dome-shaped cover of claim 1, wherein at least some of the thin portion is closer to the collar portion than to the hemispherical portion.

15. The dome-shaped cover of claim 14, wherein the entire thin portion is closer to the collar portion than to the hemispherical portion.

16. The dome-shaped cover of claim 1, wherein the collar portion, the hemispherical portion, and the cylindrical portion are formed from a continuous material.

17. A method for manufacturing a dome-shaped cover, comprising:
forming a cavity by a stripper plate for forming an outer surface of a cylindrical portion, a collar portion, and a gate connected to the collar portion, a concave mold piece for forming an outer surface of a hemispherical portion, and a convex mold piece for forming inner surfaces of the hemispherical portion and the cylindrical portion; and
injecting resin into the cavity through the gate connected to the collar portion,
wherein the stripper plate includes a projecting portion for forming a thin portion and a forming portion for forming the outer surface of the cylindrical portion,
wherein the cylindrical portion has the thin portion on the outer surface thereof,
wherein the outer surface of the thin portion is a part of the outer surface of the cylindrical portion,
wherein the thin portion is recessed from the outer surface of the cylindrical portion toward the inner surface of the cylindrical portion,
wherein, in a circumferential direction of the cylindrical portion, the thin portion is bordered by other portions of the cylindrical portion,
wherein the other portions of the cylindrical portion are thicker than the thin portion, and
wherein the thin portion is formed opposite a gate mark on the collar portion where resin is injected into the cavity through the gate.

18. The method for manufacturing a dome-shaped cover according to claim 17, wherein the projecting portion is located in a portion of the cavity that is filled with the resin from the gate last.

19. The method for manufacturing a dome-shaped cover according to claim 17, wherein the projecting portion is shaped such that a width thereof decreases toward the collar portion.

20. The method for manufacturing a dome-shaped cover according to claim 17, wherein the forming portion for forming the outer surface of the cylindrical portion is shaped so as to be at an angle with respect to a mold opening direction such that an opening diameter thereof increases toward the collar portion, the projecting portion is located so as to be at an angle smaller than the angle of the forming portion or parallel to the mold opening direction, and an amount by which the projecting portion projects increases toward the collar portion.

21. A mold for forming a dome-shaped cover, comprising:
a stripper plate for forming an outer surface of a cylindrical portion, a collar portion, and a gate connected to the collar portion;
a concave mold piece for forming an outer surface of a hemispherical portion; and
a convex mold piece for forming inner surfaces of the hemispherical portion and the cylindrical portion,
wherein the stripper plate includes a projecting portion for forming a thin portion and a forming portion for forming the outer surface of the cylindrical portion,
wherein the thin portion is formed on the outer surface of the cylindrical portion,
wherein the outer surface of the thin portion is a part of the outer surface of the cylindrical portion,
wherein the thin portion is recessed from the outer surface of the cylindrical portion toward the inner surface of the cylindrical portion,
wherein, in a circumferential direction of the cylindrical portion, the thin portion is between other portions of the cylindrical portion that are thicker than the thin portion, and
wherein the thin portion is formed opposite the gate connected to the collar portion.

22. The mold for forming a dome-shaped cover according to claim 21, wherein the projecting portion has a width that decreases toward the collar portion.

23. The mold for forming a dome-shaped cover according to claim 21, wherein the cavity formed by the stripper plate is shaped so as to be at an angle with respect to a mold opening direction such that an opening diameter thereof increases toward the collar portion, the projecting portion is formed so as to be parallel to the mold opening direction, and an amount by which the projecting portion projects increases toward the collar portion.

24. A dome-shaped cover comprising:
a hemispherical portion,
a collar portion, and
a cylindrical portion,
wherein the hemispherical portion and the cylindrical portion have outer surfaces and inner surfaces,
wherein the inner surface of the cylindrical portion has a diameter,
wherein the hemispherical portion has an end connected to an end of the cylindrical portion, and the cylindrical portion has an end connected to an end of the collar portion at an end opposite to the end connected to the hemispherical portion,
wherein the collar portion has a gate mark,
wherein the cylindrical portion has a thin portion, the thin portion being recessed from the outer surface of the cylindrical portion toward the inner surface of the cylindrical portion, wherein, in a circumferential direction of the cylindrical portion, the thin portion is abutted by other portions of the cylindrical portion that are thicker than the thin portion, and
wherein a distance between the outer surface of the thin portion of the cylindrical portion and a portion of the outer surface of the cylindrical portion that is closest to the gate mark of the collar portion is greater than the diameter of the inner surface of the cylindrical portion.

* * * * *